United States Patent [19]
Gersheneld et al.

[11] Patent Number: 5,914,701
[45] Date of Patent: Jun. 22, 1999

[54] NON-CONTACT SYSTEM FOR SENSING AND SIGNALLING BY EXTERNALLY INDUCED INTRA-BODY CURRENTS

[75] Inventors: Neil Gersheneld, Somerville, Mass.; Thomas Zimmerman, Flushing, N.Y.; David Allport, Boston, Mass.

[73] Assignee: Massachusetts Institute of Technology, Cambridge, Mass.

[21] Appl. No.: 08/907,062

[22] Filed: Aug. 6, 1997

Related U.S. Application Data

[63] Continuation of application No. 08/436,982, May 8, 1995, abandoned.

[51] Int. Cl.$^6$ .............................. H04B 5/00; G09G 5/00
[52] U.S. Cl. .............. 345/156; 340/870.37; 340/825.71; 455/41; 455/100; 345/157; 345/158
[58] Field of Search ...................... 345/156, 158, 345/157, 174; 340/562, 561, 407.1, 870.37, 563, 564, 825.71; 341/21, 31, 32, 33; 434/12; 455/41, 100; H04B 5/00

[56] References Cited

U.S. PATENT DOCUMENTS

| | | | |
|---|---|---|---|
| 4,688,037 | 8/1987 | Krieg | 340/825.72 |
| 4,903,012 | 2/1990 | Ohuchi | 340/709 |
| 4,918,737 | 4/1990 | Luethi | 381/68.4 |
| 4,988,981 | 1/1991 | Zimmerman et al. | 340/709 |
| 5,204,672 | 4/1993 | Brooks | 340/825.71 |
| 5,367,315 | 11/1994 | Pan | 345/156 |
| 5,380,983 | 1/1995 | Cavada et al. | 219/250 |
| 5,488,204 | 1/1996 | Mead et al. | 178/18 |

FOREIGN PATENT DOCUMENTS

| | | |
|---|---|---|
| 60-250731 | 5/1986 | Japan . |
| 61-046639 | 7/1986 | Japan . |
| 2 129 176 | 5/1984 | United Kingdom . |

*Primary Examiner*—John K. Peng
*Assistant Examiner*—Linus M. Lo
*Attorney, Agent, or Firm*—Cesari and McKenna, LLP

[57] ABSTRACT

A wireless system includes one or more transmitters and one or more remote receivers that are respectively coupled through one or more users and room ground. The transmitters each produce low-frequency, low power signals that, through capacitive coupling, pass as displacement currents into and from the body of the user, which acts as a conductive node. A receiver that couples capacitively to the user responds to the displacement currents and reproduces the signals. The transmitter includes a signal generator and a pair of electrodes. The signal generator produces modulated signals that vary the voltage between the electrodes, a first one of which is closely coupled capacitively to the user's body such that the "quasi-electrostatic" field resulting from the electrode potential causes a displacement current to pass to the user's body. The second electrode is oriented so that its coupling to the room ground is stronger than that of the first electrode, such that room ground acts as a return path for the current from the receiver. The signal generator may modulate the information to be transmitted using, for example, a pseudorandom code, to produce spread spectrum signals. This increases noise immunity and allows multiple transmitters, each using a different modulation code, to operate at the same time. The receivers each include a detector/demodulator that acquires and tracks the signals from the one or more transmitters.

25 Claims, 9 Drawing Sheets

NON-CONTACT SYSTEM FOR SENSING AND SIGNALLING BY EXTERNALLY INDUCED INTRA-BODY CURRENTS

This application is a continuation of Ser. No. 08/436,982 filed on May 08, 1995 now is abandoned.

FIELD OF THE INVENTION

This invention relates generally to the use of small currents externally induced in people by electrostatic field coupling, and more particularly, to systems that can be used for wireless communication among proximate devices, and for sensing a person's position for use in control tasks.

BACKGROUND OF THE INVENTION

There is a need for personal communication systems that allow portable devices, such as pagers, telephones, computer terminals, and so forth, carried on the person to communicate with each other and with fixed location devices. For example, a user may want to store in a personal computer a message received over the air by a paging terminal. Known prior personal communication systems typically require that these two devices be interconnected by wire, which makes it cumbersome to affix them to users and/or interconnect them to each other, and thus, inconvenient to use.

In medical environments, systems for gathering information such as blood pressure, EKG readings, and so forth typically require that instruments taking the readings from a patient be connected, by wire, to a patient-carried system component that monitors or stores the information. These system are also cumbersome to affix to a user.

In other applications, wireless systems are currently used to transmit information between system components by, for example, radio waves, microwaves, infra-red signals and so forth. These systems may not be suitable for sending information between the user-mounted system components discussed above because of problems with interference in the immediate environment or between the signals transmitted from the various devices.

For example, devices in systems that use infra-red signals should optimally communicate with line-of-sight transmissions, which are not always possible between devices carried by a user. Further, the infra-red systems suffer from interference with ambient light, which can not always be controlled by the user. And, for systems transmitting signals at high frequencies, the users' bodies absorb the radiating energy, and thus, degrade the signals.

Further, such systems are subject to government regulation, since their signals radiate significantly. Also, these systems allow others to eavesdrop on the transmissions.

Wireless transmission systems have also been used to determine relative position. Such systems determine the position of a transmitter based on the timing or strength of signals received by various receivers. These systems are not well suited for and can be unreliable for determining position and orientation at close distances.

SUMMARY OF THE INVENTION

The invention is a wireless system in which a transmitter and a receiver are coupled through a user and room ground, rather than by wire or by optical or high frequency transmitted signals. The transmitter produces low-frequency, low power signals that, through capacitive coupling, pass as displacement currents into and from the body of the user. The user's body acts as a conductive node and a receiver that is capacitively coupled to the user's body responds to the displacement currents passed to it from the body, to detect the low frequency signals. The user's body thus becomes part of the system rather than an impediment to signal propagation. Also, since the transmitter and receiver do not couple with one another directly, the shared room ground provides the return path for the current.

The transmitter includes a signal generator and a pair of electrodes, referred to hereinafter as inner and outer electrodes. The signal generator produces modulated signals that vary the voltage between the electrodes. The inner electrode is closely coupled capacitively to the user's body such that the "quasi-electrostatic" field resulting from the electrode potential causes a displacement current to pass to the user's body. The outer electrode is oriented so that its coupling to the room ground is stronger than that of the inner electrode, such that room ground acts as a return path for the current from the receiver.

The signal generator may modulate the information to be transmitted using, for example, a pseudorandom code, to produce spread spectrum signals. This increases noise immunity and allows multiple transmitters, each using a different modulation code, to operate at the same time.

The receiver includes a pair of electrodes and a detector/demodulator that acquires and tracks the spread spectrum signal. One of the electrodes is closely coupled capacitively to the user's body such that displacement current that passes from the body passes to that electrode. The current then flows through detector circuitry to the other electrode, which is asymmetrically coupled capacitively to room ground, to complete the path for the current. The current varies in accordance with the current passed to the body from the transmitter, and thus, in accordance with the signals produced by the signal generator.

The detector circuitry detects the current and operates in a conventional manner to recover the transmitted information therefrom.

There are a number of uses for the system—to communicate information both "intra-body" and "inter-body," to receivers that are capacitively coupled to the user. The system may also be used as a position-sensor, with an array of multiple receivers determining the position of the person based on the relative strengths of the received signals coupled out of the person. Since the signals are not transmitted as radiated energy, small (compared to a wavelength) and essentially flat electrodes may be used in the transmitters and receivers. These electrodes efficiently couple to the user by virtue of their surface area and can, for example, be readily incorporated into a watch, a credit card sized component, a shoe, and so forth. These electrodes are in contrast to the antennas required to efficiently transmit and receive radiated energy. Moreover, since there is negligible radiation of the electromagnetic energy from the electrodes, the system does not fall under government regulations directed to transmitting systems. Further, the system does not have the problem that planar capacitive sensing system have with transmitting over an intervening ground plane.

In one configuration the system passes information between carried or worn components of, for example, a paging system. In this configuration a users carries in his pocket a paging terminal that includes a transmitter. The user also wears a watch that includes a display and a receiver. Both the transmitter and the receiver are capacitively coupled to the user and to room ground, such that signals from the transmitter pass to the receiver as displacement currents to and from the user, respectively. When the paging terminal receives a paging message over the air, the transmitter passes the message to the receiver for display. The transmitter passes the message to the user as a displacement current, and the receiver receives the message from the user as a displacement current.

In an alternative configuration the system passes to a receiver that is worn or carried by a user, information from medical instruments that are monitoring the physiological condition of the user. In this configuration, each of the medical instruments is connected directly to an associated transmitter that is worn by the user. Each of these transmitters is capacitively coupled to the user and to room ground, such that the signals are passed as displacement currents to the user and from the user to the receiver.

In an alternative embodiment, a transmitter carried by the user passes signals to one or more nearby receivers carried by other users or located in fixed positions. In the quasi-electrostatic field produced by the transmitter the user is capacitively coupled to the receivers through the atmosphere. Accordingly, the user need not physically contact the receivers to pass information to them. For example, two users shaking hands may transfer information between transmitters and receivers they each carry. The proximity of the hands provides a conductive path for the signal current. The return path can be a combination of air and earth ground. Any materials in the vicinity of the transmitter and receiver, such as metal cabinets, reinforcement studs, and so forth, also contribute to the return path.

An alternative system may be incorporated into a general-purpose computer and provide the user with a multi-dimensional input device. Such a system includes an array of receivers and one or more transmitters. The array of receivers are mounted around the periphery of the computer screen and the transmitter may be carried by the user or mounted on, for example, the side of a keyboard.

The user repositions an on-screen object in two-dimensional space or three-dimensional virtual space displayed on the screen by making contact with the transmitter with one hand, for example, his left hand, and moving his right in front of the screen. A processor connected to the receivers in the array determines, based on the relative strengths of the received signals, the relative position of the user's right hand and moves the object to the corresponding on-screen position.

To allow a user to select, or "click on," a particular on-screen object, one or more auxiliary receivers may be mounted on the key board, for example, below the space bar. The user directs the object to a desired location by moving his right hand in front of the screen and clicks on that location by moving the thumb of this left hand closer to the auxiliary receiver in the keyboard. Since the user need not make contact with the auxiliary receiver, the receiver can be combined with, or incorporated directly into, the spacebar or one or more keys of the keyboard.

When the system is be used to move three-dimensional objects or the user, that is, move the user's viewpoint, in three-dimensional virtual space, the array of receivers senses the relative position of the user's hand in front of the screen and based on that position determines if the user desires to move through the virtual space forward, backward, up, down, left or right, and also how fast the user desires to move, as discussed in more detail below. In addition, a foot pedal may be used as an accelerator to further control the "granularity" of the movement of the user through the virtual space, as discussed below.

The system may include a portable, scalable receiving device that consists of an array of three orthogonal electrodes that are, respectively, connected to three receivers. A processor connected to the three receivers determines, based on the signals received by the individual receivers, the relative position of the user. The electrodes are extended or collapsed, as necessary, to accommodate the relative scale of the user's physical movements to the movements of the user within, for example, the three-dimensional virtual space displayed on an associated screen.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
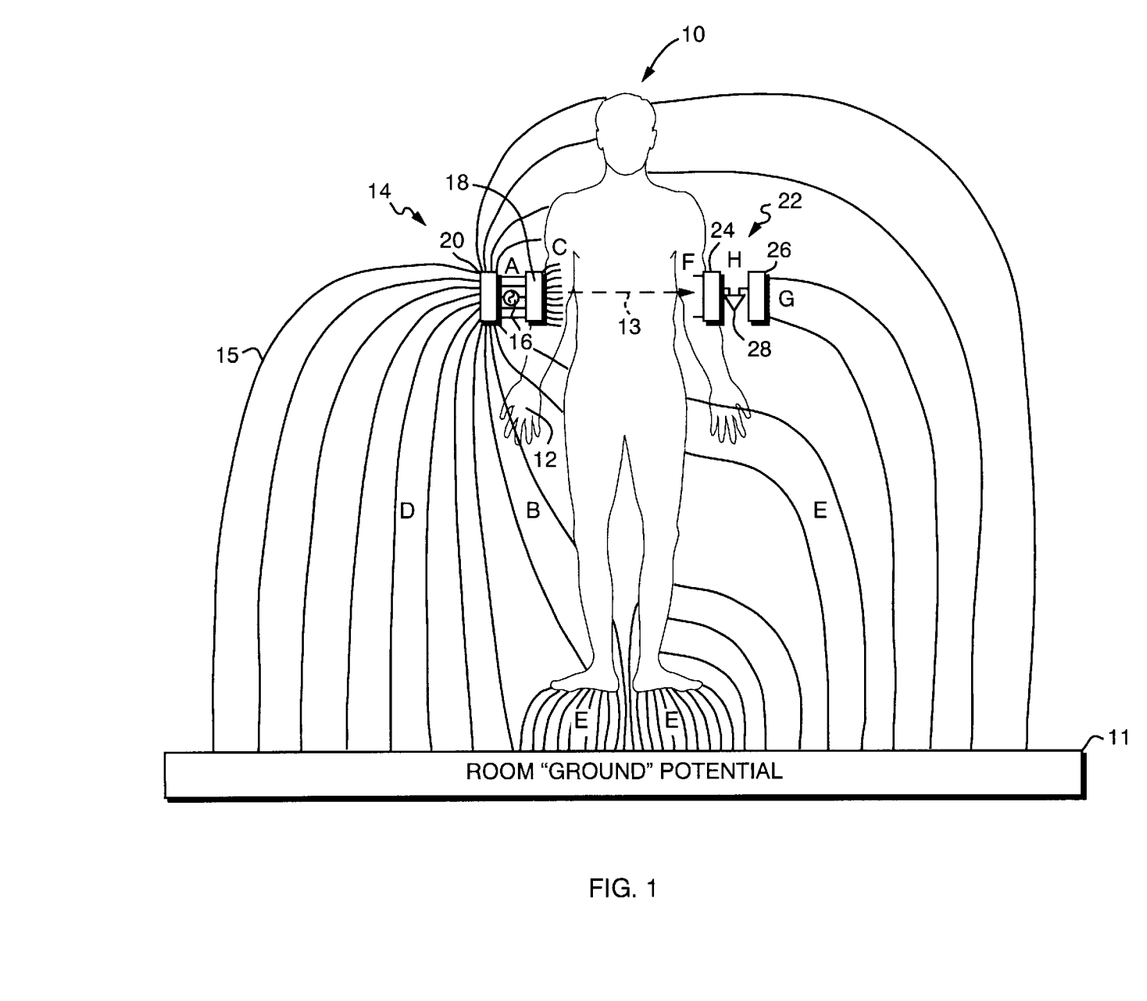
FIG. 1 is a functional block diagram of a system constructed in accordance with the invention.

FIG. 1 depicts a user 10 who has attached to one arm 12 a transmitter 14 that consists of a signal generator 16 connected between a pair of electrodes 18 and 20, referred to individually as an inner electrode 18 and an outer electrode 20. As discussed in more detail below, the inner and the outer electrodes 18 and 20 are capacitively and assymetrically coupled, respectively, to the user 10 and to room ground denoted in the drawing by the numeral 11. The signal generator 16 produces between these electrodes 18 and 20 a voltage that gives rise to a quasi-electrostatic field depicted in the drawing by solid lines 15. A resulting displacement current passes between the inner electrode 18 and the user 10. A portion of this current flows through the user in a path 13, depicted in the drawing by a dotted line, and passes as a displacement current to a receiver 22 that is attached to the user's other arm 12.

The receiver 22 includes a detector 28 and a pair of electrodes 24 and 26, referred to individually as an inner electrode and an outer electrode. The inner electrode 24 is closely coupled capacitively to the user 10 and the outer electrode 26 is coupled capacitively to room ground, such that a displacement current passes from the user 10 to the inner electrode 24. The current then flows through the detector 28 to ground, and thus, back to the transmitter 14. The detector 28 detects the current and extracts therefrom the transmitted information.

Current flows also along other paths (not shown) through the user. Most notably, the current flows from the user to room ground. This results in an attenuation of the current that passes to the receiver 22. Accordingly, the receiver must be capable of detecting, or measuring, relatively small currents.

The transmitter 14 may modulate the signals by using, for example, direct-sequence spread spectrum modulation. This increases the system's immunity to noise. Also, it allows multiple transmitters, each using a different modulation code, to transmit information at the same time, as discussed in more detail below. Alternatively, the modulation may instead be simply binary on/off modulation, and if multiple transmitters are used each transmits at a different frequency.

Figure 2:
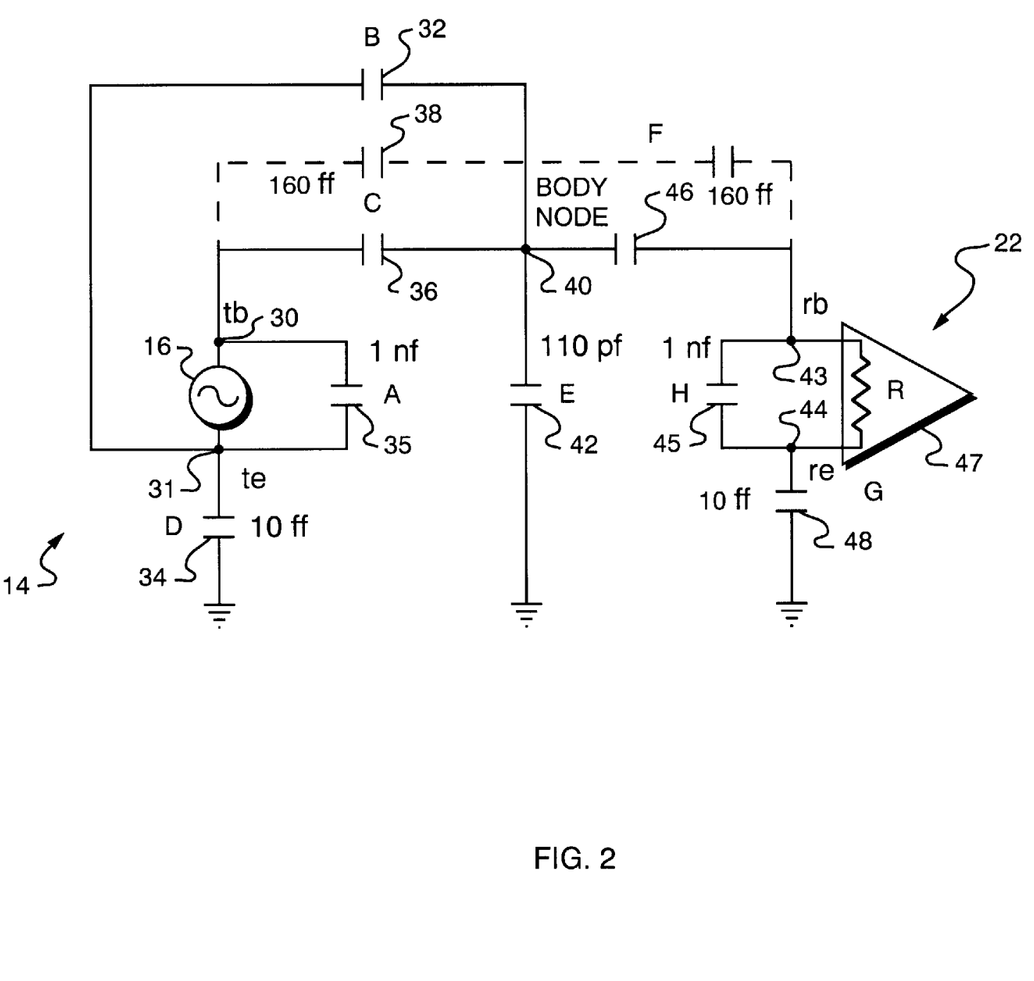
FIG. 2 is a simplified schematic of the system of FIG. 1 showing typical numbers for capacitances.

A simplified electrical model of the wireless system is shown in FIG. 2. The signal generator 16 produces low frequency signals, preferably between 100 and 1000 kilohertz. At these frequencies and with the relative impedances involved in the circuit, the user can be considered as a conductive node 40.

The signal generator 16 is connected between two nodes 30 and 31 that represent, respectively, the inner and outer electrodes 18 and 20. The signals produced by the signal generator 16 result in a current passing from node 30 to a node 40, to which it is coupled by a capacitance 36. The current passes from the user-node 40 to a node 43 that represents the inner electrode 24 of the receiver 22. A capacitance 46 represents the coupling between these two nodes. The current then flows through the receiver 22, that is, through a detector 47 and node 44, to ground through a coupling represented by a capacitance 48. The node 31 of the transmitter provides the return path for the current, as represented by a capacitance 34.

There is direct capacitive coupling between the electrodes 18 and 20 of the transmitter 14, as represented by a capacitance 35 between the nodes 30 and 31. The node 30 is also capacitively coupled to the receiver 22, through the air, by a capacitance 38. This coupling is relatively weak, however, because of the distance between the transmitter and the receiver.

The node 31 is coupled to the user-node 40, through the air, as represented by a capacitance 32. This coupling provides additional current paths for the transmitted signal traveling through the user-node 40.

The user-node 40 is coupled to ground, as represented by a capacitance 42. This coupling shorts a relatively large portion of the current to ground, and thus, significantly attenuates the current passed from the user to the receiver.

The coupling from the inner electrode 24 to the outer electrode 26 of the receiver is represented by a capacitance 45. If the detector 47 is detecting current, this coupling has little affect since the current measuring resistance, denoted by R in the drawing, of the amplifier 47 is typically smaller than the impedance of the capacitance 45. If the detector 47 is detecting a potential, the coupling between the nodes creates a current leakage path through the receiver 22 to ground.

Figure 3:
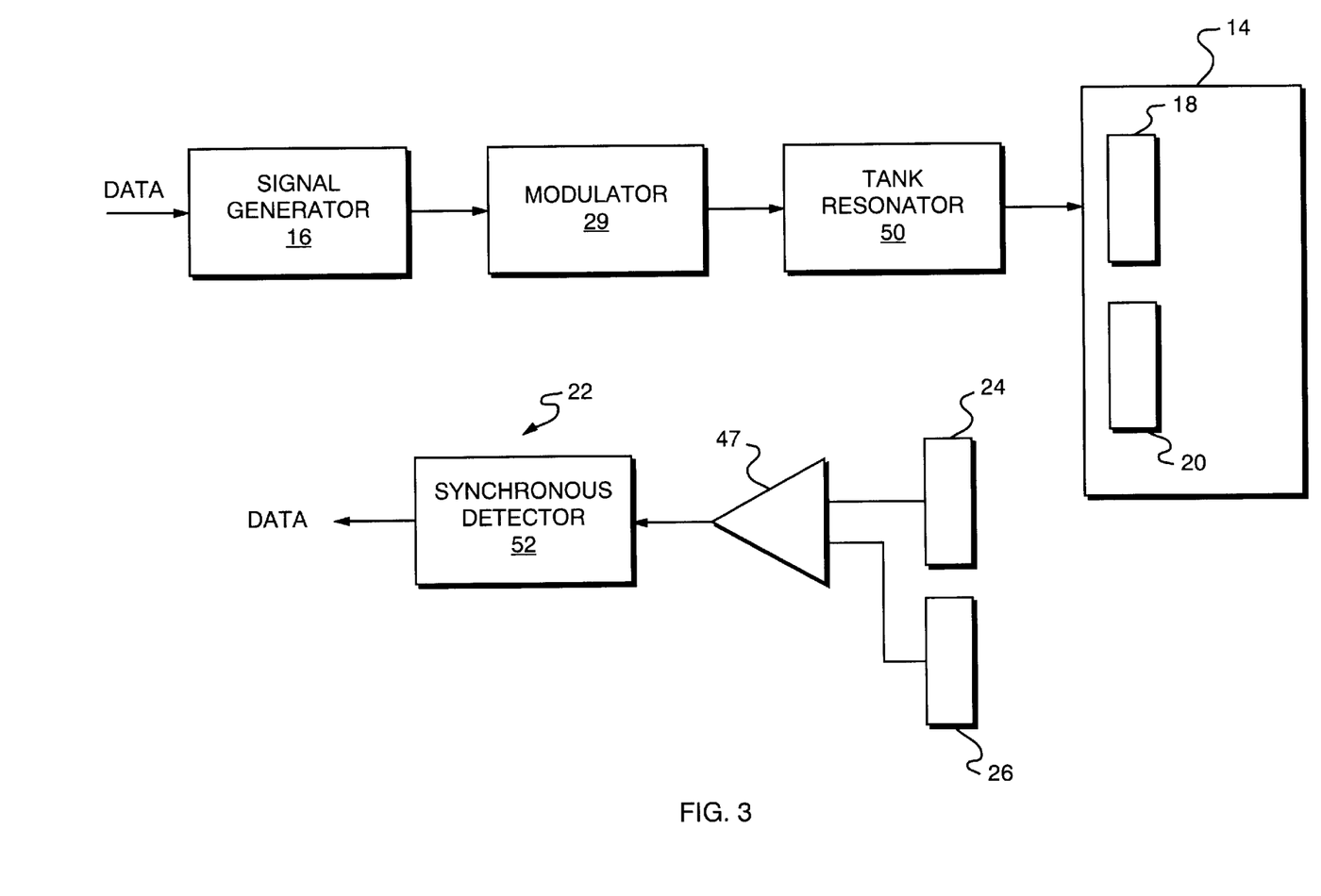
FIG. 3 is a functional block diagram of a transmitter and receiver of FIG. 1.

Referring now to FIG. 3, the transmitter preferably includes the signal generator 16 and a direct-sequence spread spectrum modulator 29. The modulator modulates the signals produced by the signal generator in accordance with a pseudorandom code, and supplies the modulated signal through a tank resonator 50 to the electrodes 18 and 20. The tank resonator 50 converts square waves to sine waves at the frequency of interest, without radiating energy at the higher-frequency components of the square wave.

The receiver 22 includes the amplifier 47, which amplifies a signal that corresponds to the displacement current that passes from the user to the inner electrode 24, though a synchronous detector 52 to the outer electrode 26. A synchronous detector 52, operating in a conventional manner, demodulates the signal and reproduces the transmitted information.

As discussed, multiple transmitters 14 may be included in the system. Each transmitter uses a different pseudorandom code in its modulator 29. This allows the receiver to distinguish the signals transmitted simultaneously by various transmitters, based on the codes. Alternatively, the transmitters may transmit at different carrier frequencies or at different times, in which case the receiver distinguishes between the various signals based on these frequencies or times of transmission.

Figure 4:
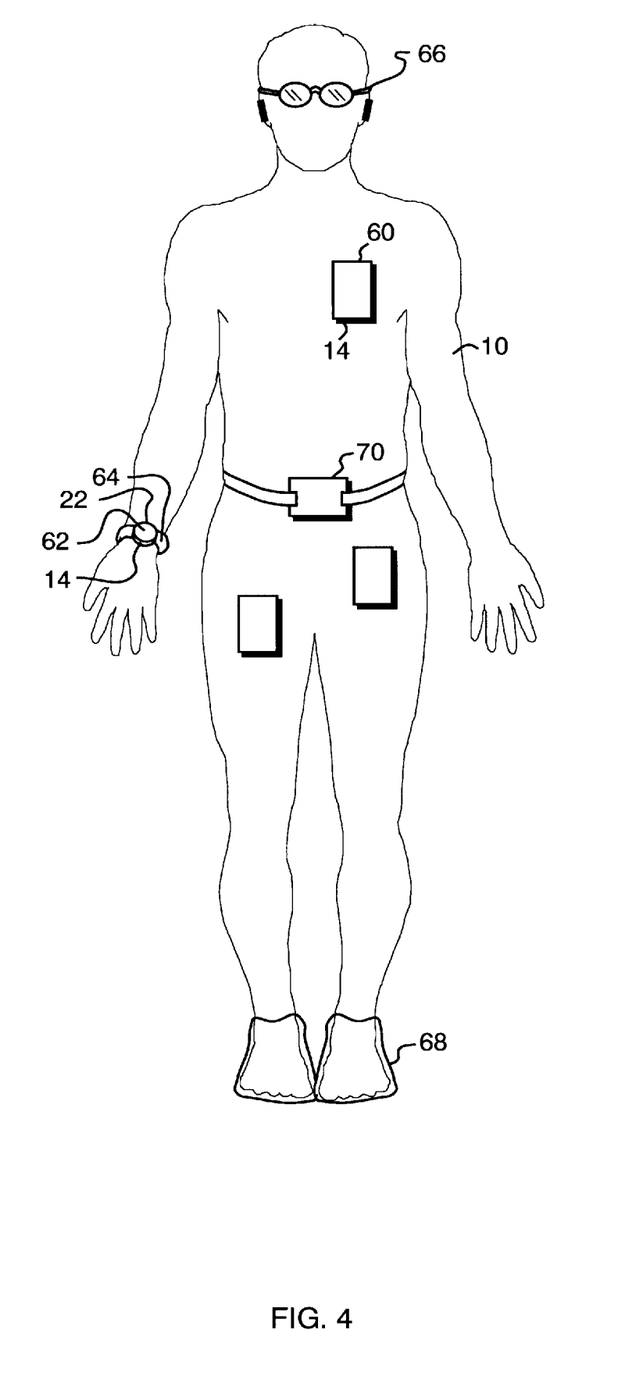
FIG. 4 illustrates an exemplary use of the system with a plurality of transmitters.

FIG. 4 depicts one application for the system. In this configuration the system is incorporated into various components of a paging system that the user wears or carries. The user carries, for example, in his pocket, a paging terminal 60 that receives paging messages over the air in a conventional manner. The paging terminal includes the transmitter 14, which is capacitively coupled to the user and to ground. The transmitter produces signals that include information from the received messages and passes the signals to the user as displacement currents.

A display device 62 that is incorporated in, for example, the user's watch 64, includes a receiver 22 that is capacitively coupled to the user. The receiver 22 reproduces the signals from the displacement current passed to it, and the display then presents the information included therein to the user. The watch 64 may also include one or more buttons (not shown) that a user may use to select, for example, storage options for the paging messages. The various system components may instead be incorporated into the user's glasses 66, shoes 68, belt buckle 70, and so forth.

There is no wire connection between the receiver and the transmitter, since they are each capacitively coupled to the user and to room ground, and thus, communicate through the user's body. Accordingly, the system does not interfere with the user's clothing or restrict his movements.

Figure 5:
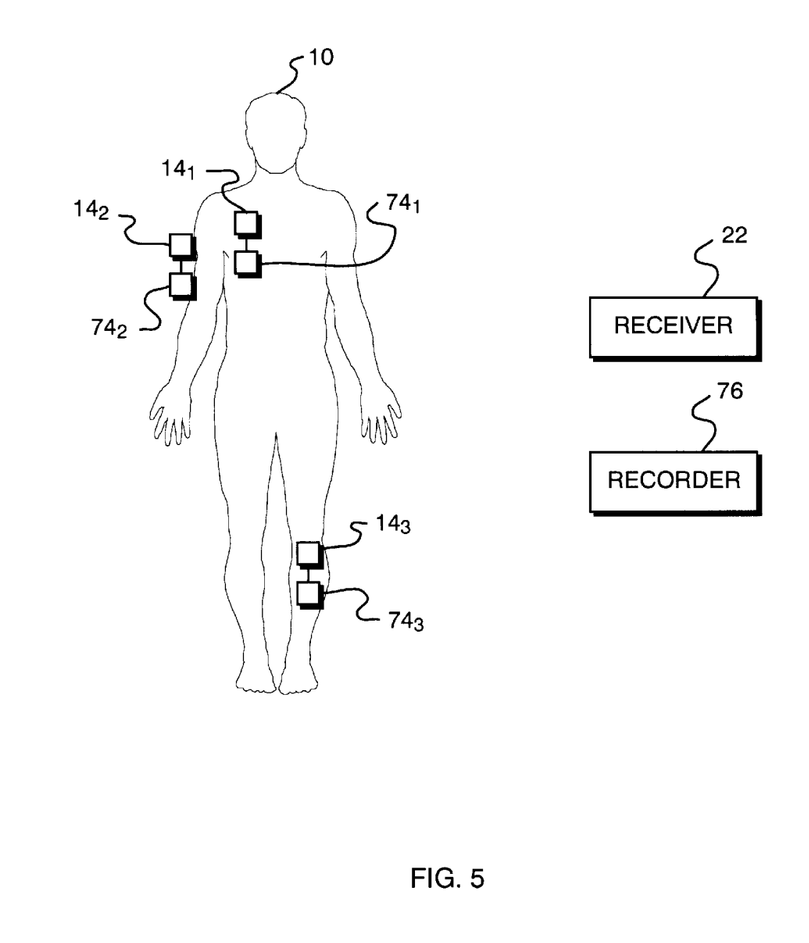
FIG. 5 illustrates an alternative use of the system.

Another application for the wireless system is to pass information that represents the user's physiological condition between a plurality of transmitters and a receiver that are each capacitively coupled to the user. Referring now to FIG. 5, a plurality of transmitters $14_1, 14_2, 14_3$ . . . are connected, respectively, to instruments $74_1, 74_2, 74_3$ . . . that measure blood pressure, take EKG readings, and so forth. Each transmitter receives data from the associated instrument and produces modulated signals that include the data. These signals result in displacement currents passing between the transmitters and the user 10 and from the user 10 to the receiver 22, which is connected to a recorder 76 that records the data.

Figure 6:
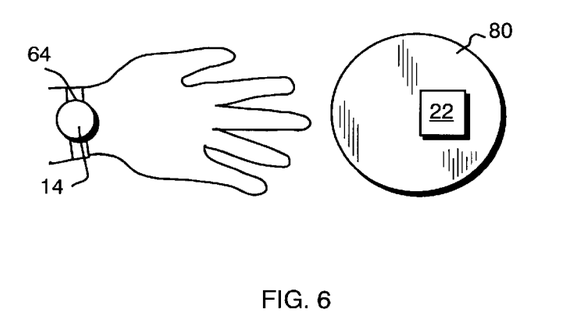
FIG. 6 illustrates an alternative configuration of the system.

Referring now to FIG. 6, the system may also be used to pass signals inter-body to a receiver that is proximate to but not mounted or carried on the user's body. As discussed above, the return path for the current is through room ground, and no connecting wires are required. A user wears the transmitter 14, for example, as part of his watch 64, and the receiver 22 is mounted on a door (not shown) or within a doorknob 80 that controls the opening of the door. The transmitter 14 produces a modulated signal that includes a personal identification number. This signal is capacitively coupled to the receiver 22 when the user grasps or comes sufficiently close to the doorknob. The receiver 22 determines if it recognizes the number, and if so locks or unlocks the door, as appropriate.

Similarly, two users shaking hands can each exchange information between receivers and transmitters that they are carrying, to exchange, for example, electronic business cards.

Other applications of the system are discussed below, with reference to FIGS. 7 and 8. In these applications an array 102 of receivers 22 is at a fixed location. The receivers 22 determine the relative position of a user-carried transmitter from the relative strengths of the received signals.

Figure 7:
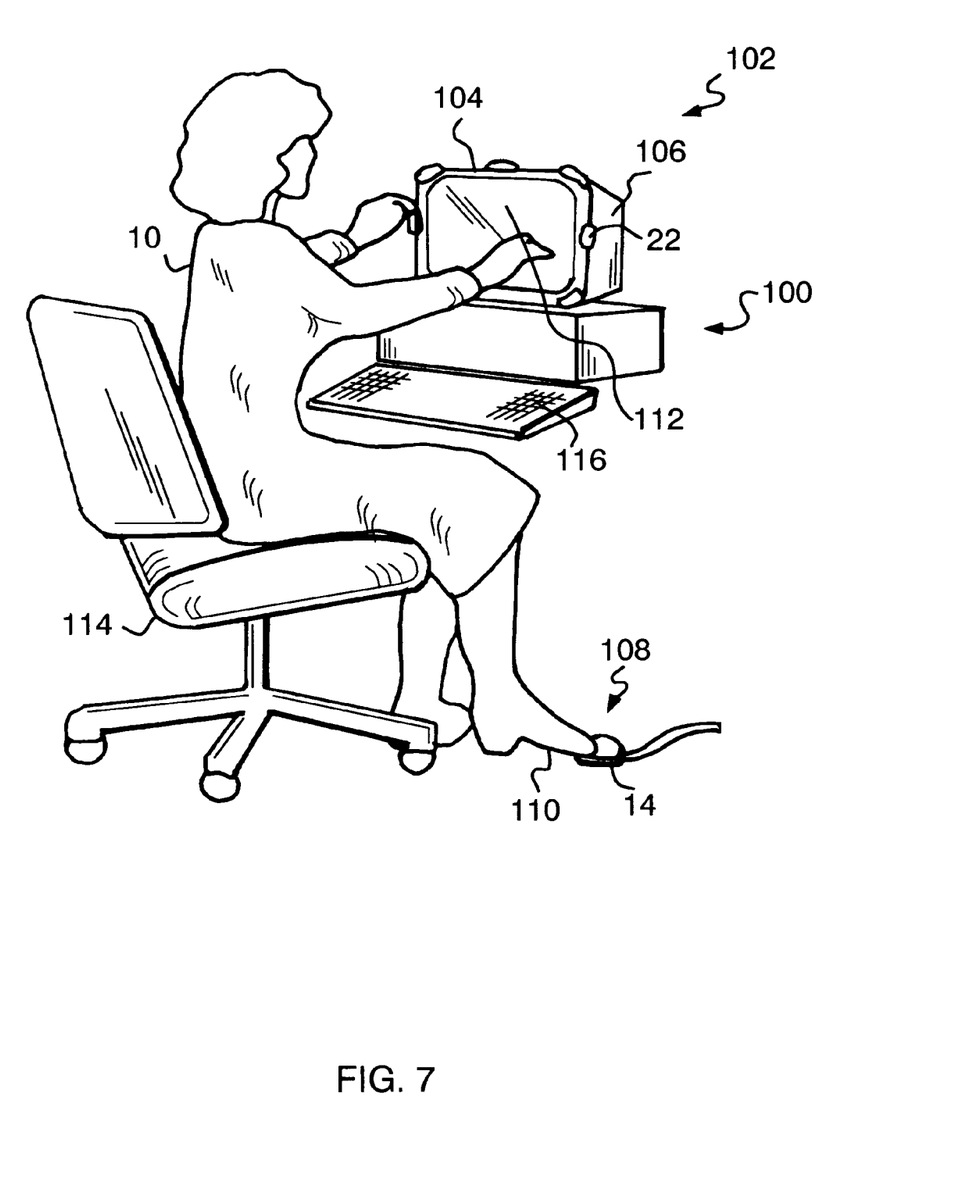
FIG. 7 illustrates a use of the system as part of a personal computer.

FIG. 7 depicts the wireless system incorporated into a personal computer 100. The system provides to the user a multi-dimensional input device that allows a user, with hand gestures, to move in two dimensions an on-screen object such as a cursor, or in three dimensions a three-dimensional on-screen object or herself, that is, her viewpoint, through a virtual space that is displayed on the screen.

The system includes the array 102 of receivers 22, which are mounted in close proximity to a screen 104 of a monitor 106. The transmitter 14 is incorporated into a foot pedal 108 that the user contacts when she desires to move an on-screen object or, her virtual space viewpoint.

The user places her foot 110 on the foot pedal 108 and moves one of her hands 112 in front of the screen 104. As discussed above, the transmitter 14 is capacitively coupled to the user 10 and to ground. The signals produced by the transmitter 14 are passed as currents through the user and from the user's hand 112 to the array 102 of receivers 22. A processor 111a, which is housed in the computer drive 111, connected to receive signals from the array 102 determines the relative position of one or both of the user's hands, based on the relative strengths of the signals received by the various receivers. The processor then moves, for example, the on-screen object to a corresponding location on the screen.

When the system is used to move the user or an object in a three-dimensional virtual space that is displayed on the screen, the system determines where the user's hand is relative to a predetermined "neutral" position that corresponds to a mid-point in the range of movement to which the receiver responds. If, for example, the receiver responds to movements of the user's hand when the hand is at most one meter from the screen and ten centimeters to the left, right, above or below the screen, the neutral position is the center of the screen at the distance between the screen and one meter that corresponds to the middle of the operational range of the receivers.

If the user moves one of her hands between the neutral position and the screen the system moves the user forward through the virtual space. If the user also moves one of her hands to the left of the neutral position, the system moves the user at a corresponding angle to the left in the space, and so forth. As the user moves one or both of her hands farther and farther from the neutral position, the system moves the user faster and faster through the virtual space in the direction that corresponds to the relative position of the user's hand.

In an alternative arrangement of this system, the transmitter 14 is included on the keyboard 116 or in a chair cushion 114, instead of in the foot pedal 108. In this arrangement, the foot pedal may optionally be used to control the "granularity" of the user's movement in the virtual space, that is, to control the scale of the movements through the space. The user depresses the foot pedal to speed the user's overall movement in the virtual space and released to slow that movement. If, for example, the user is moving between buildings in the virtual space she depresses the foot pedal to accelerate her progress through the space and repositions her hand to regulate and direct the accelerated movements. When the user enters a room in the building, she releases the foot pedal to slow her movements, and again uses her hand to regulate and direct the decelerated movements.

The wireless system readily translates the three-dimensional movements of a user's hand to movements of the user through three-dimensional virtual space. This is in contrast to input devices that operate in two-dimensions and cannot readily convey simultaneously backward or forward, up or down, and left or right movements to the on-screen objects. Further, the user may direct the movement using one or both of her hands, as appropriate.

Figure 8:
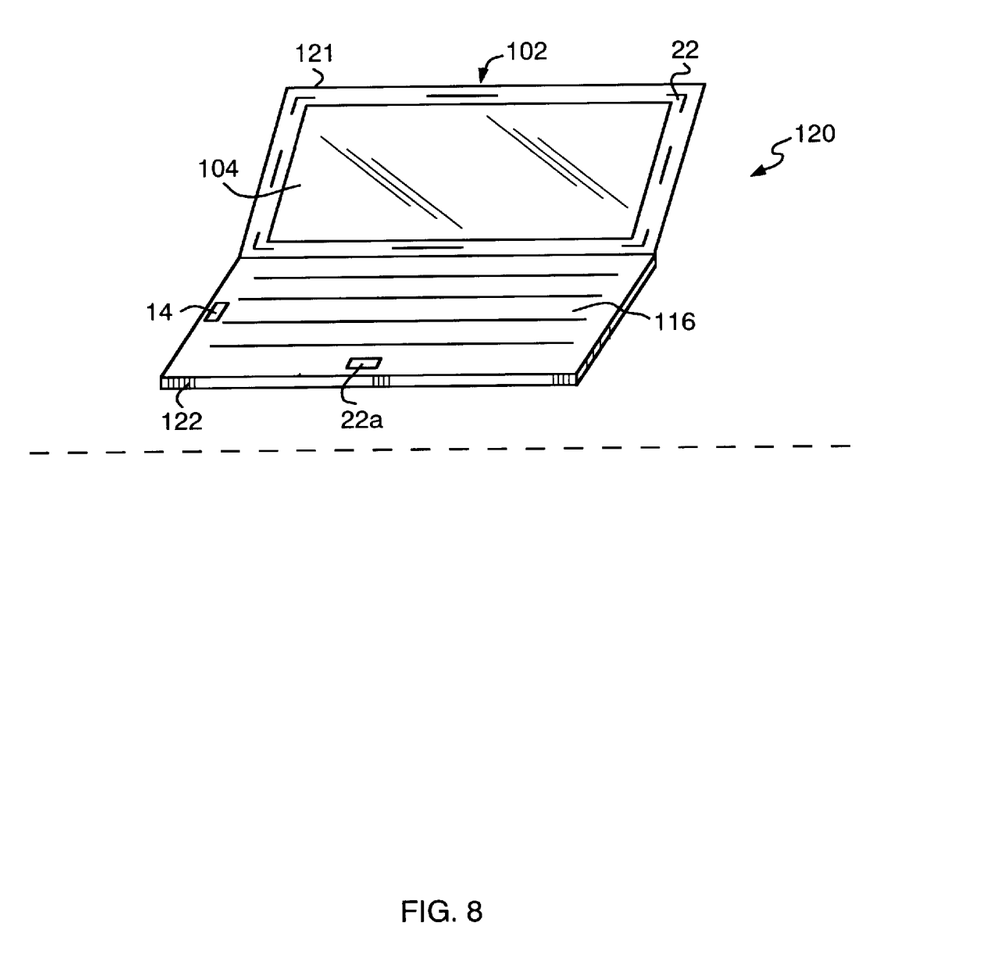
FIG. 8 illustrates a use of the system as part of laptop computer.

Referring now to FIG. 8, a laptop computer 120 incorporates the wireless system to replace the mouse and/or control the movement of the user through three-dimensional virtual space. The array 102 of receivers 22 is mounted adjacent to the screen 104 in the lid 121 of the laptop. The transmitter 14 is incorporated into the base 122 of the laptop, on one side of or next to the keyboard 116. A user touches the transmitter 14 with one hand, for example, her left hand, and controls the movements of objects displayed on the screen by positioning her right hand in front of the screen, as discussed above with reference to FIG. 7

One or more auxiliary receivers 22a may be mounted on the keyboard 116, to allow a user to select, or "click on," a particular on-screen object. The user makes her selection by moving the thumb of her left hand proximate to the appropriate auxiliary receiver 22a.

Figure 9:
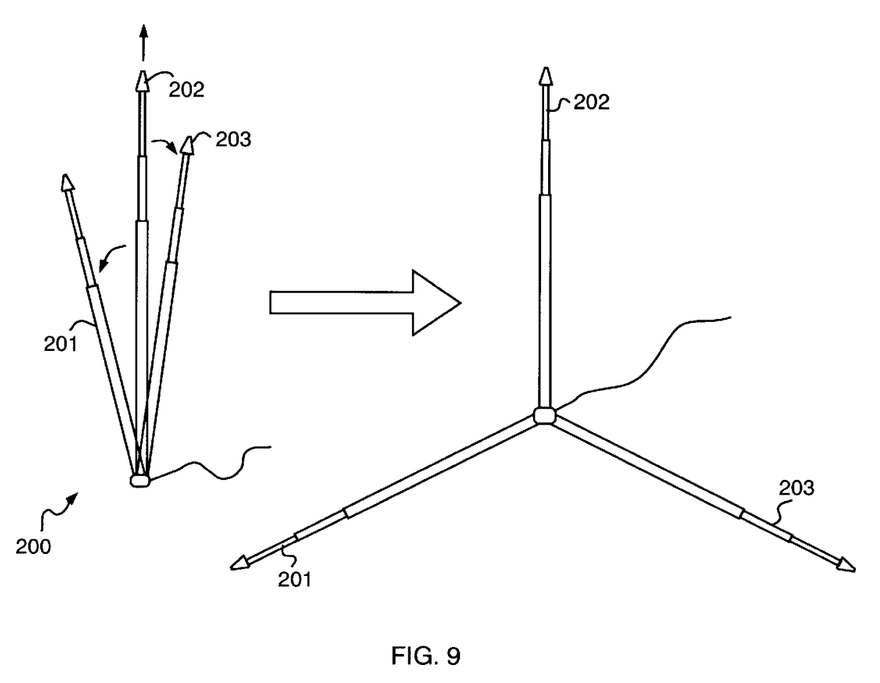
FIG. 9 depicts a scalable receiver.

FIG. 9 depicts a portable, scalable input device 200 that consists of an array 201 of receivers 22. The array includes three orthogonal, electrically isolated electrodes 201–203 that are part of three receivers 22. Each electrode is capacitively coupled, through the air and through room ground, to a user (not shown) who is nearby. A processor 205 connected to process the signals received by the electrodes determines the relative position of the user based on the strengths of the signals received by each of the electrodes. This array may be used instead of the array 102 depicted in FIGS. 7 and 8.

The electrodes 201–203 can be extended or collapsed over a range of several inches to two feet, as necessary, to scale the expected range of movement of the user or users to the range of movements of on-screen objects in, for example, three-dimensional virtual space. The electrodes can be selectively extended and collapsed to accommodate fully the expected range of movement. The device 200, when collapsed fits into a pocket for easy transport.

Figure 10:
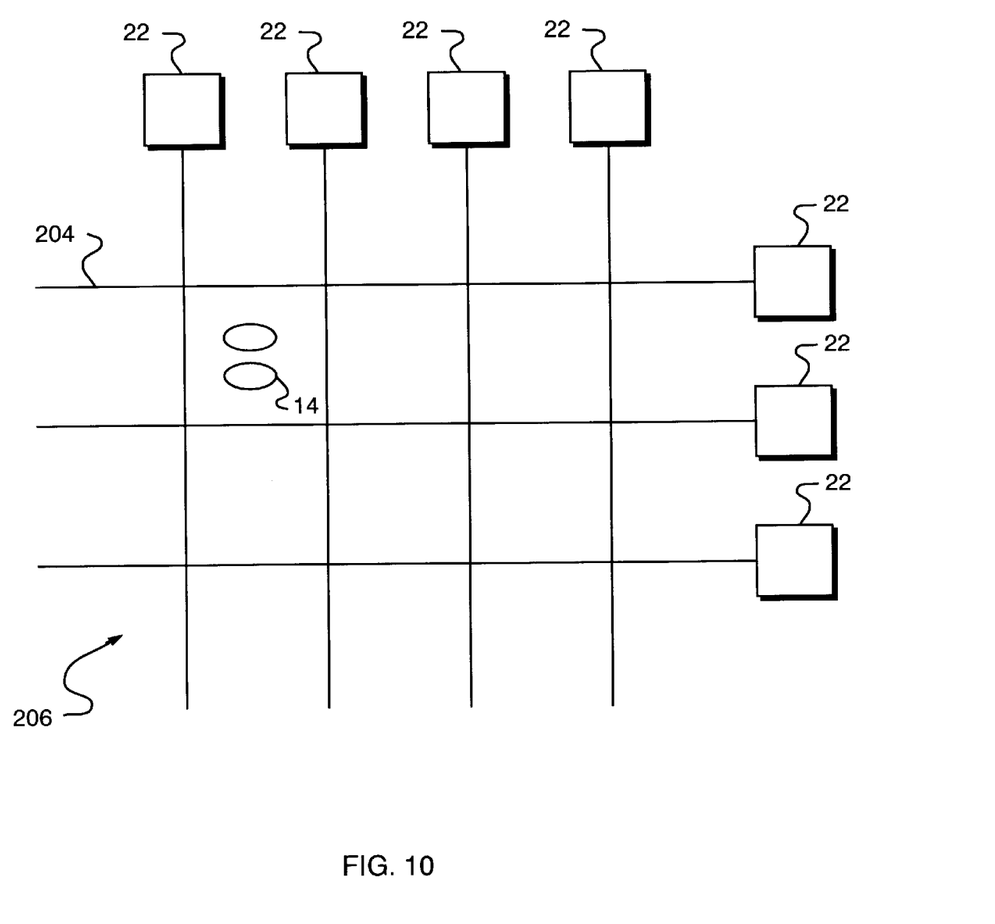
FIG. 10 depicts an alternative system.

FIG. 10 illustrates an alternative wireless system that includes multiple receivers 22 that are connected to lines 204. The lines are arranged in a grid 206 and may be included in a rug or floor. A user carries a transmitter 14, preferably in his or her shoes. The wireless system determines the position of the user by determining which receivers receive the strongest signals from the transmitter. The receivers distinguish individual users based on the modulation codes associated with their respective transmitters. Again, the return path for current is through room ground, and thus, the transmitter and receiver electrodes pass the signals capacitively instead of as radiated energy.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A wireless communication system including:

A. a transmitter for producing low frequency signals that include data, the transmitter being capacitively coupled to a user and to ground, the transmitter passing to the user a current that is associated with the low frequency signals; and B. a receiver that is displaced from the user and is coupled to ground for receiving when capacitively coupled to the user a current that is associated with the signals produced by the transmitter, the receiver reproducing the transmitted signals and recovering the data.

2. The wireless communication system of claim 1, wherein the transmitter includes:

i. a pair of electrodes; and ii. a signal generator connected between the electrodes, the signal generator generating the low frequency signals that result in an associated displacement current between the electrodes and the user.

3. The wireless communication system of claim 2, wherein the receiver includes:

i. a pair of electrodes; and ii. a signal detector connected between the electrodes, the signal detector reproducing the low frequency signals from a displacement current developed between the electrodes and the user.

4. The wireless communication system of claim 1 wherein the system further includes a. a plurality of receivers; and b. a processor for determining from the signals reproduced by the receivers the position of the user relative to one or more of the receivers.

5. The wireless communication system of claim 4 wherein:

the receivers are mounted on the periphery of a computer screen; and the processor moves a cursor to a position on the screen that is associated with the position of the user relative to one or more of the receivers.

6. The wireless communication system of claim 2 wherein the transmitter further includes a signal modulator for spread spectrum modulating the signals with a predetermined pseudorandom code.

7. The wireless communication system of claim 6 wherein the system further includes a plurality of transmitters, each of the transmitters being associated with a predetermined code that differs from the codes associated with the other transmitters in the system, the receiver using the codes to distinguish between the signals passed from each of the transmitters in the plurality of transmitters.

8. The wireless communication system of claim 7 wherein each of the transmitters in the plurality of transmitters is capacitively coupled to a different user, and the receiver receives signals respectively from the individual transmitters when the receiver is capacitively coupled to the individual transmitters.

9. The wireless communication system of claim 8 wherein the system further includes:

a. a plurality of receivers; and b. a processor for determining from the signals reproduced by the receivers the relative positions of the users.

10. The wireless communication system of claim 9 wherein:

the receivers are mounted on the periphery of a computer screen; and the processor moves one or more objects to positions on the screen that are associated with the positions of one or more of the users relative to one or more of the receivers.

11. A computer system including:

A. a screen for displaying on-screen objects;

B. a keyboard for data entry to the system;

C. a transmitter for producing low frequency signals, the transmitter being capacitively coupled to a user to pass to the user a current that is associated with the low frequency signals;

D. a plurality of receivers mounted on the periphery of the screen, each of the receivers in the plurality receiving from the user, through capacitive coupling to the user, a current that is associated with the signals produced by the transmitter, the receivers determining the position of the closest extremity of the user's body relative to one or more of the receivers; and E. a processor for controlling the screen display, the processor directing the screen to display the objects in positions that correspond to the position of the user's extremity as determined by the receivers.

12. The computer system of claim 11 wherein the transmitter is incorporated into the keyboard.

13. The computer system of claim 11 further including a receiver that is mounted on the keyboard, the receiver determining, based on the strength of the received signals if the user is selecting the information that is displayed below the cursor, the system determining that the user is selecting the information if the strength of the signals received by the receiver mounted on the keyboard is above a predetermined threshold.

14. A wireless communication system including:

A. a plurality of transmitters for producing low frequency signals, the transmitters being capacitively coupled to one or more users and to ground and, respectively, including a pair of electrodes and connected between the electrodes a signal generator that generates low frequency signals, each transmitter passing to the associated user a current that is associated with the low frequency signals; and B. a plurality of receivers coupled to ground for receiving, respectively, from the one or more users to which they capacitively couple one or more currents associated with the signals produced by the transmitters, the receivers reproducing the transmitted signals; and C. a processor for determining from the signals reproduced by the receivers the respective positions of the users relative to one or more of the receivers.

15. The wireless communication system of claim 14 wherein:

i. the transmitters each, respectively, transmit signals associated with a different predetermined code; and ii. the receivers distinguish between the signals produced by the individual transmitters based on the codes.

16. The wireless communication system of claim 14 wherein the receivers distinguish between the signals produced by the individual transmitters based on the times the signals are transmitted.

17. The wireless communication system of claim 14 wherein:

i. the transmitters each, respectively, transmit signals at different predetermined frequencies; and ii. the receivers distinguish between the signals produced by the individual transmitters based on the frequencies.

18. A system including:

A. a screen for displaying one or more on-screen objects including a cursor;

B. a keyboard for data entry to the system;

C. a transmitter for producing low frequency signals, the transmitter being capacitively coupled to a user to pass to the user a current that is associated with the low frequency signals;

D. a plurality of receivers mounted on the periphery of the screen, each of the receivers in the plurality receiving from the user, through capacitive coupling to the user, a current that is associated with the signals produced by the transmitter, the receivers determining the position of the closest extremity of the user's body relative to one or more of the receivers;

E. a selection receiver mounted on the system for determining, based on the strength of the received signals, if the user is selecting the information that is displayed below the cursor, the system determining that the user is selecting the information if the strength of the signals received by the selection receiver is above a predetermined threshold; and F. a processor for controlling the screen display, the processor directing the screen to display one or more of the objects in positions that correspond to the position of the user's extremity as determined by one or more of the plurality of the receivers.

19. The system of claim 18 wherein the selection receiver is mounted on the keyboard.

20. The system of claim 19 wherein the system further includes a plurality of selection receivers.

21. The wireless communication system of claim 1 wherein the receiver is mounted on an object.

22. The wireless communication system of claim 1 wherein the receiver is coupled to another user.

23. The wireless communication system of claim 1 wherein the system further includes:

a. a plurality of transmitters that are capacitively coupled to one or more users;

b. a plurality of receivers that are displaced from the users; and c. a processor for determining from the signals reproduced by the receivers the positions of the one or more users relative to one or more of the receivers.

24. The wireless communication system of claim 23 wherein:

i. the transmitters also receive signals; and ii. the receivers also transmit signals.

25. The wireless communication system of claim 1 wherein:

i. the transmitter also receives signals; and ii. the receiver also transmits signals.

* * * * *